United States Patent
Zhang et al.

(10) Patent No.: US 11,929,104 B2
(45) Date of Patent: Mar. 12, 2024

(54) DATA STORAGE DRIVE WITH DEDICATED ERASE TRANSDUCER

(71) Applicant: Seagate Technology LLC, Fremont, CA (US)

(72) Inventors: Lihong Zhang, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 9 days.

(21) Appl. No.: 17/675,367

(22) Filed: Feb. 18, 2022

(65) Prior Publication Data

US 2023/0267952 A1     Aug. 24, 2023

(51) Int. Cl.
*G11B 5/024* (2006.01)
*G11B 5/09* (2006.01)
*G11B 5/55* (2006.01)
*G11B 5/325* (2006.01)

(52) U.S. Cl.
CPC ............ *G11B 5/024* (2013.01); *G11B 5/09* (2013.01); *G11B 5/5521* (2013.01); *G11B 5/325* (2013.01)

(58) Field of Classification Search
None
See application file for complete search history.

(56) References Cited

U.S. PATENT DOCUMENTS

| | | | | |
|---|---|---|---|---|
| 4,729,048 A * | 3/1988 | Imakoshi et al. | ...... | G11B 5/012 360/121 |
| 5,719,730 A | 2/1998 | Chang et al. | | |
| 6,671,117 B2 * | 12/2003 | Dimitrov et al. | ...... | G11B 5/012 360/57 |
| 7,710,675 B2 | 5/2010 | Dugas et al. | | |
| 9,311,501 B2 | 4/2016 | Islam et al. | | |
| 9,640,205 B1 * | 5/2017 | Kaizu et al. | ......... | G11B 5/024 |
| 10,366,711 B1 * | 7/2019 | Liu et al. | ............... | G11B 5/024 |
| 2011/0043940 A1 * | 2/2011 | Wagner et al. | ........ | G11B 5/024 360/57 |

OTHER PUBLICATIONS

DocuVault Information Sheet, "Tips for Safe & Secure Hard Drive Destruction", 2022, DocuVault Delaware Valley LLC, West Deptford, New Jersey, 5 pages. Available online at https:docuvaultdv.com/how-to-securely-destroy-a-hard-drive/. Obtained online Jan. 6, 2022.
Kennedy, "The 6 Layers of Google GCP Data Center Security", Jun. 19, 2020, ServeTheHome, 6 pages. Available online at https://www.servethehome.com/the-6-layers-of-google-gcp-data-center-security/. Obtained online Jan. 6, 2022.

\* cited by examiner

*Primary Examiner* — Craig A. Renner
(74) *Attorney, Agent, or Firm* — Mueting Raasch Group

(57) ABSTRACT

A recording head has a magnetic write transducer having a first crosstrack width operable to write a single track of data at a time to a magnetic disk. The recording head also has a magnetic erase transducer separate from the magnetic write transducer. The magnetic erase transducer has a second crosstrack width operable to simultaneously erase multiple tracks of data from the magnetic disk.

19 Claims, 5 Drawing Sheets

DATA STORAGE DRIVE WITH DEDICATED ERASE TRANSDUCER

SUMMARY

The present disclosure is directed to a data storage device with a dedicated erase transducer. In one embodiment, a recording head has a magnetic write transducer having a first crosstrack width operable to write a single track of data at a time to a magnetic disk. The recording head also has a magnetic erase transducer separate from the magnetic write transducer. The magnetic erase transducer has a second crosstrack width operable to simultaneously erase multiple tracks of data from the magnetic disk.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to security of magnetically recorded data. User data security is a growing concern globally. One aspect of security of importance to many users is the erasure of sensitive data on persistent storage devices, such as hard disk drives (HDDs), solid-state drives (SSD), magnetic tape, optical media, etc. Generally, when these devices are no longer needed (e.g., due to upgrades, retirement of equipment), all data on the device should be erased such that the previously written data can no longer be recovered. While all types of storage media (e.g., magnetic, flash memory, optical) have similar issues related to secure erasure, this disclosure relates to security of magnetically recorded data, e.g., data stored in an HDD.

Current HDD users, which include individuals, enterprises, and data centers, often adopt physical shredding or other mechanical/chemical destroying methods to guarantee data security protection. While effective, device destruction generates waste and eliminate ability to repurpose the device and/or its constituent parts. Other methods of data erasure can be used, including bulk degaussing and self-erasure.

While bulk degaussing does not physically destroy the drives, it can still render the drive inoperable as the strong magnetic fields result in erasure of servo marks that were written onto the disk surfaces during manufacture. Self-erasure involves overwriting each track with an erasure signal (e.g., pure tones, random data). While self-erasure allows the drive to be re-used, this method has some issues that prevent it from being widely adopted.

For example, given the relatively weak magnetic field of the drive's built-in writer, overwriting the data may leave residual fields that may allow data to be recovered using sophisticated equipment. Also, self-erasure may be too time consuming to be practical for users that need to retire large numbers of high-capacity drives. For example, a 10 TB HDD may need ~15 hours to be erased completely, and a data center may retire a number of these on a regular basis.

In embodiments described herein, an HDD includes a head-integrated erase transducer. An erase transducer uses similar principles as the write transducer (e.g., electrical coil generates a magnetic field), an erase transducer may be much larger (relative to track width) and more powerful than a write transducer. Such an erase transducer may be integrated with other components of the head, including read and write transducers, the erase transducer may be physically distanced from those components.

Figure 1:
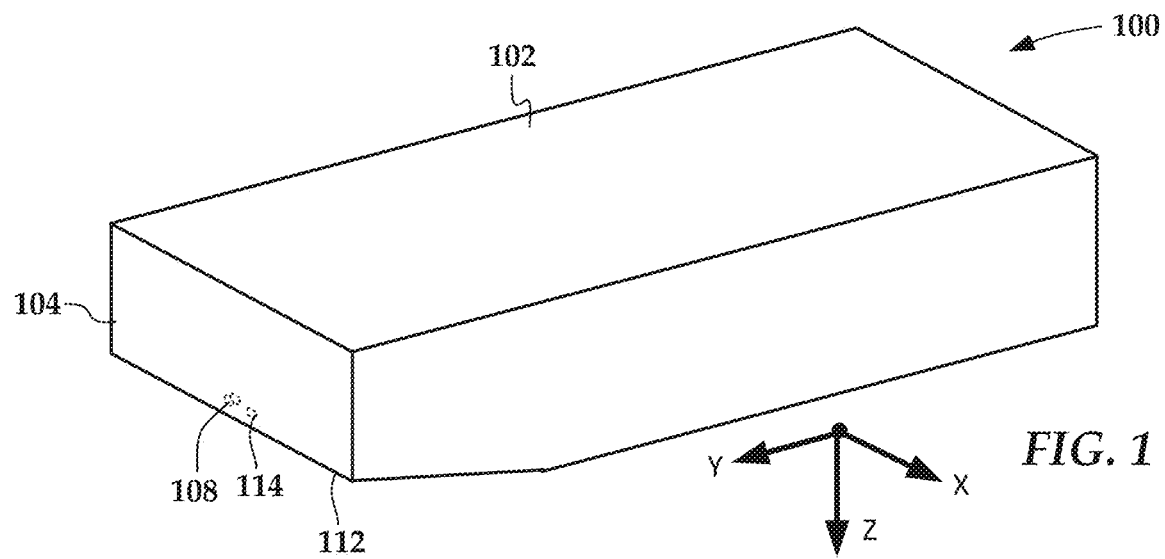
FIG. 1 is a perspective view of a recording head according to an example embodiment.

In reference now to FIG. 1, a perspective view shows a recording head 100 according to an example embodiment. The recording head 100 is used in a magnetic data storage device, e.g., HDD, and at least one such head may be included for each disk surface. The recording head 100 may also be referred to herein interchangeably as a slider, head, write head, read head, read/write head, etc. The recording head 100 has a slider body 102 with write transducer 108 at a trailing edge 104 that is held proximate to a surface of a magnetic recording medium (not shown), e.g., a magnetic disk. A read transducer (not shown) may also be located near the write transducer and may include, for example, a magnetoresistive sensor that reads magnetic transitions recorded on disk. An erase transducer 114 is also located near the trailing edge 104

The recording head 100 may use conventional recording (e.g., perpendicular magnetic recording) or may use some sort of energy assistance for recording. An example of energy-assisted recording is heat-assisted magnetic recording (HAMR), where laser is used to form a hot spot on the recording medium while recording. Other types of energy-assisted recording include microwave assisted magnetic recording (MAMR) in which a spin torque oscillator shapes the magnetic fields to write smaller bits.

Figure 2:
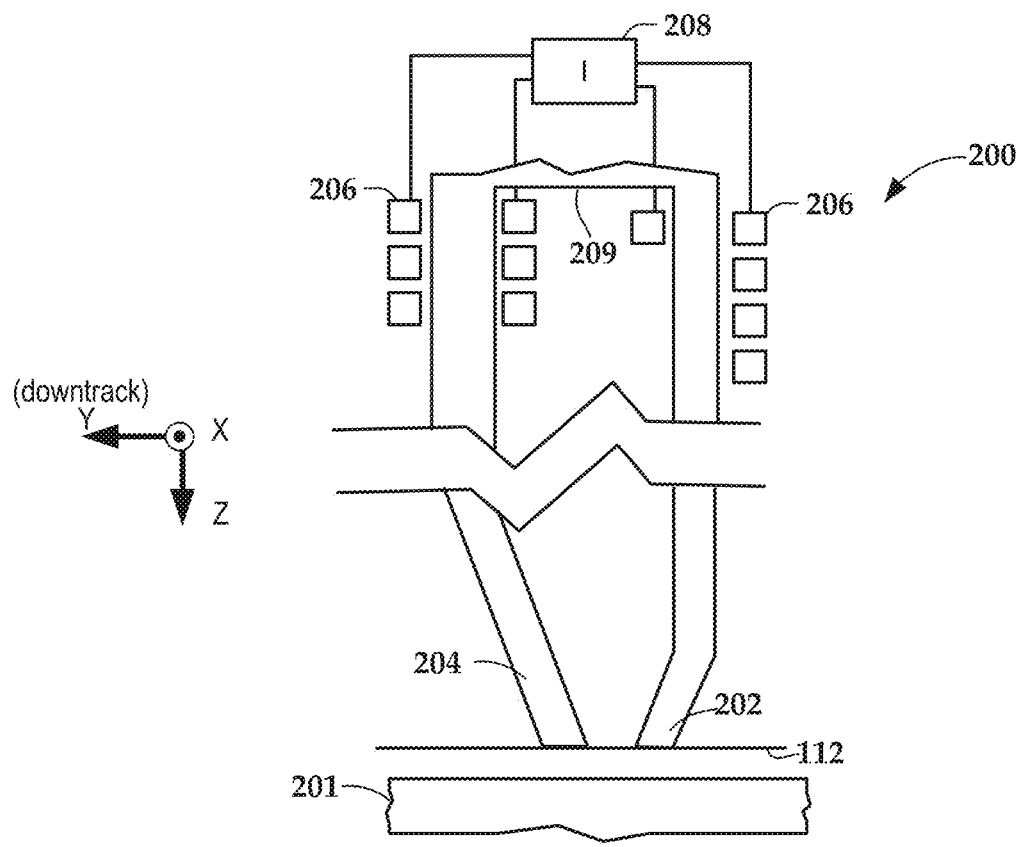
FIG. 2 is a cross-sectional view of a write transducer according to an example embodiment.

In FIG. 2, a cross section view of the recording head shows details of a magnetic field transducer 200 according to an example embodiment. The structure of the magnetic field transducer 200 may be used in both a write transducer 108 and the erase transducer 114, although with significantly different geometry in the crosstrack direction. A write pole 202 extends to the media facing surface 112. A return pole 204 faces the leading edge of the write pole 202 and is magnetically coupled thereto via a yoke 209 located away from the media-facing surface 112. A recording medium 201 (e.g., magnetic disk) also provides flux closure. The magnetic field transducer 200 may also include a second return pole (not shown) opposed to the return pole 204 (to the right of the write pole 202 in the figure) that is also magnetically coupled to the write pole 202 via the yoke 209.

One or more coils 206 surround any combination of the write pole 202, return pole 204, and any other return poles that might be additionally included. The coils 206 are electrically coupled to one or more current sources 208 that may collectively and/or individually activate the coils 206 by applying a current through the coils 206. The current source 208 is coupled to control circuitry (not shown) that controls the current source 208, e.g., causes each current source 208 to vary amplitude and direction of the supplied current as a function of time. Note that the magnetic transducer 200 can be implemented as separate write transducers 108 and erase transducers 114 that are driven by a common current source 208 or separate current sources 208.

Generally, activation of the coils 206 via the current source 208 causes a movement of magnetic flux through a path formed by the write pole 202, recording medium 201, return pole 204, and yoke 209. The movement of magnetic flux causes the magnetic orientation of a recording layer in the medium 201 to be aligned with the flux path. Changing the characteristics of the current (e.g., magnitude, direction) applied to the cols 206 as the medium 201 moves past the magnetic field transducer 200 causes a pattern of magnetic transitions to be recorded onto the medium 201. For the write transducer 108, the applied current causes to a pattern of bits written to a track. For the erase transducer 114, the applied current may be pure tone (e.g., 1T, 2T, etc.) and/or a random signal that overwrites any previously written patterns on the medium 201, thereby making the data previously encoded on the medium 201 unrecoverable.

Figure 3:
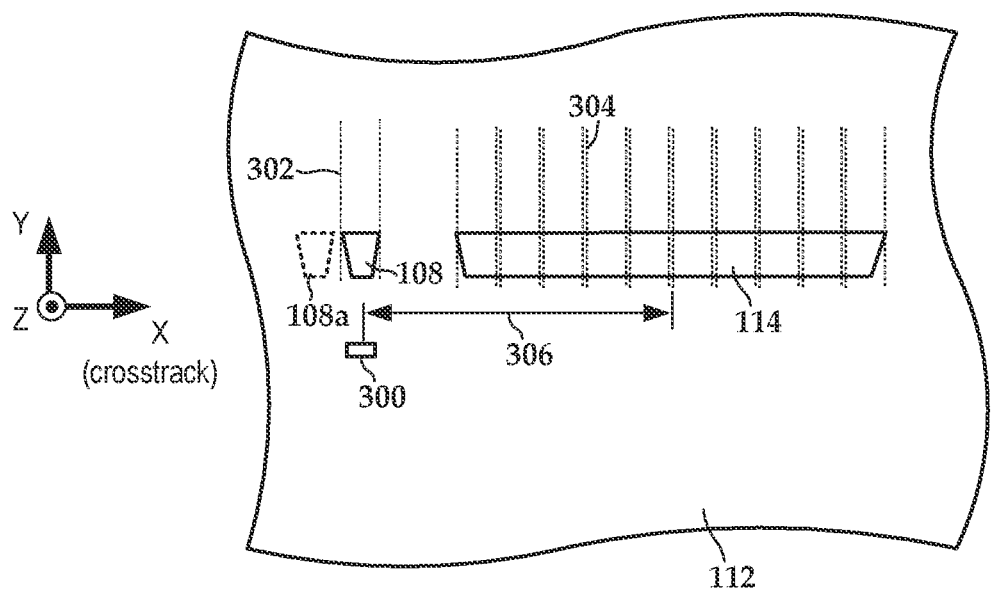
FIGS. 3-6 are media-facing surface views of erase transducer arrangements according to example embodiments.

In FIG. 3, a media-facing surface view of a recording head shows an arrangement of transducers according to an example embodiment. A write pole 108 is shown together with a read transducer 300 that is located downtrack from the write pole 108. Other components of a read/write head (e.g., return pole(s), shields, etc.) are not shown in this view to maintain clarity. It is also possible that the recording head has multiple writers, as indicated by optional second write transducer 108a, which is configured to write a single track simultaneously with or separate from the first write transducer 108. Additional read transducers in addition to read transducer 300 may also be included, although are not shown here.

An erase transducer 114 includes the illustrated write/erase pole and may include other elements (e.g., return pole) not shown here. The erase transducer 114 is physically separated from the write transducer 108, e.g., they are far enough apart and/or separated by magnetic shielding such that activation of one transducer will not induce fields in the other. The erase transducer 114 is electrically separate from the write transducer 108, e.g., they are independently controllable by the sending of different currents to each transducer 108, 114. In particular one of the different currents may be a zero or near zero current while the other is non-zero current that causes magnetic fields to be generated, e.g., a time varying AC signal. Note that the transducers 108, 114 may share some common electrical lines (e.g., ground) while still maintaining electrical separation.

The erase transducer 114 is much wider than the write transducer 108 in the cross-track direction (x-direction). For purposes of illustration, the dotted lines 302 represent a nominal track width of the write transducer 108, e.g., a single written track at zero skew. Dotted lines 304 represent a number of equivalent track widths covered by the erase transducer 114. The erase transducer 114 can erase multi tracks per revolution, thus greatly improving the erasing efficiency and effectiveness. For example, if the erase transducer 114 covers N tracks, that it can erase N times faster than the write transducer 108 (which is designed for single track width writing, N=1). In the example shown in FIG. 3, N=10, however the value of N could be lower or much higher, e.g., N=5, N=20, N=50, N=100, etc.

Note that the erase transducer 114 is aligned in the downtrack direction with the write transducer 108. This can reduce the process complexity and cost impact, as the elements of the erase transducer 114 (e.g., poles, coils) can be formed in the same process steps (e.g., material deposition and photolithography on a wafer) as the write transducer 108. Also, the build tolerances of the erase transducer 114 can be relaxed as compared to the write transducer 108 in some embodiments. For example, a multi-track erase can be performed with less precision than writing of data assuming there is no concern about preserving some data that is adjacent to the erased group of tracks. For such applications, other operational constraints can also be relaxed, e.g., servo control of track positioning, fly height, maximum current, etc. Relaxing these operational constraints may involve allowing for higher amounts of error (e.g., position error, adjacent track erasure) than would be allowed for writing data.

There may be practical limitations on the crosstrack size of the erase transducer 114, e.g., amount of space available on the media-facing surface 112, the amount of current that can be provided to energize the erase transducer 114, process limitations, etc. Nonetheless, addition of the erase transducer 114 can provide a means of erasing some or all of the recording media much more quickly than can be done using the existing write pole 108 by itself. For example, it is estimated that a 10 TB drive could be erased in around 18 minutes with an N=50 erase transducer compared to around 15 hours using just the write transducer.

Note that the erase transducer 114 is shown as a single, contiguous pole in the crosstrack direction as shown in FIG. 3. This could be coupled to a single set of coils that induce a field over the entire crosstrack width. In another embodiment shown in FIG. 4, the erase transducer 114 could be formed of two or more crosstrack segments 114a-b that can be individually activated, e.g., via separate coil sets tied to each segment 114a-b. In this way, the erasure operations may fined-tuned for different applications.

For example, a technique known as shingled magnetic recording (SMR) involves slightly overlaying adjacent tracks as they are written, which results in narrower track widths and increases areal density of the recorded data. Typically, a group of adjacent shingled tracks are written together in a band, such that changing data within that band may involve rewriting the entire band. This is because the overlapped writing prevents randomly updating individual tracks; any changes in the band typically require rewriting the band from beginning to end.

The size of SMR bands are selected based on a desired system performance. Smaller bands result in less disruption for track updates but decreased areal density. Areal density is decreased because some disk space is reserved to separate individual bands to prevent inter-band interference during writing, so smaller bands means more of this inter-band spacing is needed. Larger bands require less inter-band spacing, but will see a greater impact on performance when the bands need to be updated.

Figure 4:
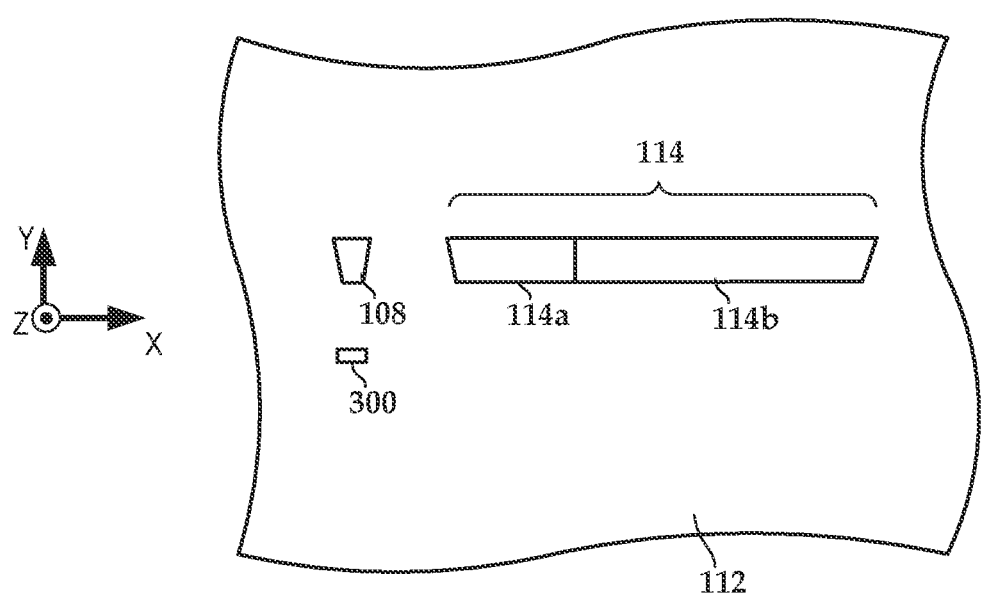

As pertains to FIG. 4, one of the segments 114a, 114b could have a crosstrack size that is operable to erase one shingled band, such that an entire group of tracks within the band can be erased in one revolution. For example, if the band was 10 tracks, then segment 114a could be configured to erase 10 tracks at once, and segment 114b could be configured to erase 20 tracks at once (also accounting for inter-band separation). By selective activation of the two segments 114a-b, any combination of one to three bands could be erased in a single revolution. In another embodiment, if the SMR device used different sized bands, e.g., 10 tracks for one set of bands (e.g., for higher performance) and 40 tracks for another set of bands (e.g., for higher density storage). In such a case, the two segments 114a-b could be sized for 10 and 40 tracks, respectively.

Figure 5:
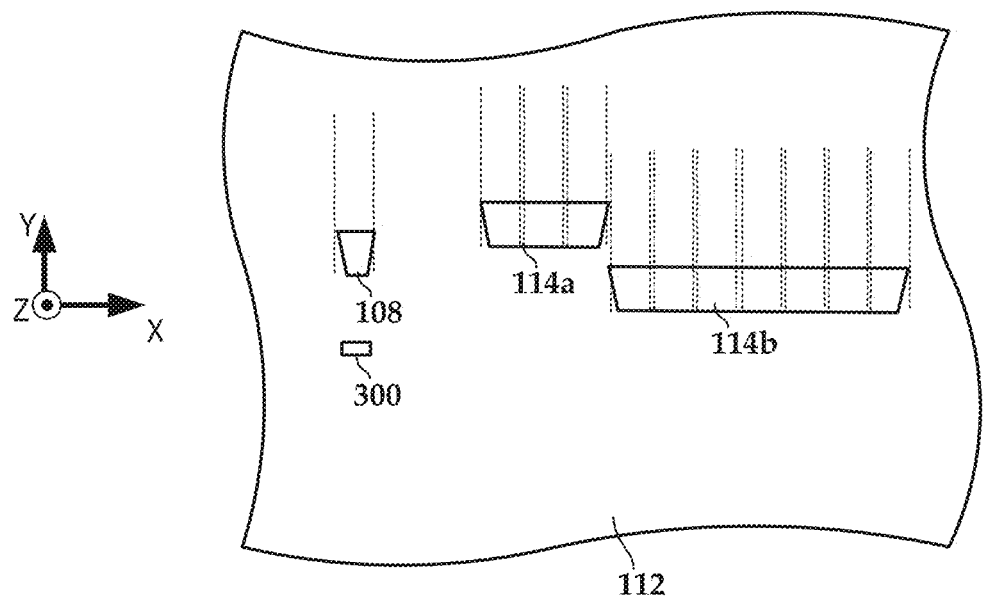

While the illustrated example in FIG. 4 shows both segments 114a-b aligned with each other, they could be offset from one another, as shown in the example embodiment of FIG. 5. In FIG. 5, the two segments 114a-b are physically separated from one another in the downtrack direction, but may be otherwise operable as described in regards to the embodiment shown in FIG. 4. Separating the segments 114a-b may have some advantages, e.g., when erasing regions of the disk where the head is highly skewed such as near the inner and outer diameters of the disk.

In the embodiments described above, the erase transducer 114 can erase every track on the disk, or just a subset of tracks. Examples of a subset of tracks include all tracks within a single partition, all tracks in an SMR band, all tracks within a specified zone/region of the disk, and or any other set of adjacent tracks spanned by the erase transducer width.

Generally, the disk will have servo marks that are magnetically recorded on the disk. During erase operations, the recording head will read the servo marks via the read transducer 300 to determine the location of the recording head over the disk. Depending on the application (e.g., erasing all tracks or a subset of tracks) and further depending on the geometry of magnetic transducers on the recording head, the servo controller may be adapted in different ways to provide the erasure functionality described herein.

Because the erase transducer in FIGS. 3-5 is offset from the read transducer 300 in the crosstrack direction (see offset 306 in FIG. 3), the servo mechanism that positions the recording head will need to account for the reader-to-erase-transducer offset 306 when determining radial location of the erase transducer 114 on the disk, e.g., when seeking to the desired erasure locations and tracking while erasing. The reader-to-erase-transducer offset 306 could be affected by temperature, e.g., due to thermal expansion of the head, as well as skew angle of the head, and this could complicate precisely locating the erase transducer 114 over the target tracks. In some cases, e.g., full disk erase, loss of tracking precision should not be an issue, as there is no worry about inadvertent erasure of user data.

If a more selective erasure is desired, e.g., just one shingle band of tracks, then the erasure process may be adapted to ensure user data that is not supposed to be erased is not affected. Using SMR band erasure as an example, the erase transducer 114 (or a segment thereof) may be sized to erase the middle of the band by a width that is less than the full band of tracks. The inner and outer tracks of the band can be erased using the write transducer 108 instead of the erase transducer. Using a 20-track band as an example, the erase transducer 114 could be configured to erase the middle 18 tracks of the band, and the write transducer can erase the innermost and outermost track. This minimizes inadvertently erasing data from the bands adjacent to the innermost and outermost track while still being around 6.7 times faster than using the write transducer 108 alone.

In the example above, where an erase transducer 114 has a smaller width than the number of tracks to be erased, another variation may involve two passes of the erase transducer 114 that overlap. In other words, if a target band of tracks to be erased spans a crosstrack distance more than the crosstrack width of the erase transducer 114, the erase transducer 114 simultaneously erases a first set of multiple tracks and then simultaneously erases a second set of multiple tracks that overlaps the first set of multiple tracks. Using the example above where an 18-track erase transducer is used to erase a 20-track SMR band that spans track n to track n+19, the erase transducer 114 could make a first pass over tracks n to n+17, and then a second pass over tracks n+2 to n+19. This would be faster than using the write transducer at the outer tracks and would provide extra assurance that the middle tracks were erased.

Figure 6:
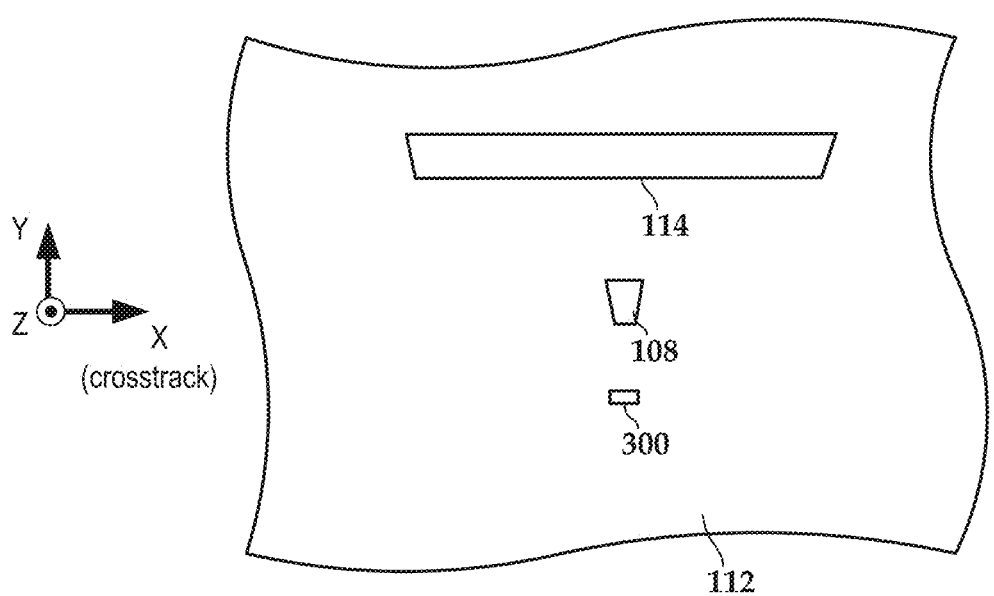

In other embodiments, the erase transducer 114 could be aligned with the read transducer 300 as shown in FIG. 6. This could increase cost of producing the head but can result in better or less complicated servo control than other embodiments. Note that the erase transducer 114 shown in FIG. 6 could be divided into separately controllable segments as shown in FIGS. 4 and 5.

Note that other control systems related to the recording head besides track positioning may also take into account the existence of a separate, dedicated erase transducer 114. For example, recording heads maintain a flying distance over the disk surface through the use of air-bearing featured formed on the media-facing surface, which is often referred to as an air-bearing surface (ABS). A thin layer of air (or another gas, e.g., helium) in the drive enclosure will move together with the drive surface as it spins. The ABS is configured with aerodynamic features such that this moving layer of air causes the recording head to float above the surface by a predetermined about, sometimes referred to as a fly-height.

In modern drives, it is desired to more tightly control the separation distance between the read and write transducers and the disk surface. This can be done by way of an actuator that moves the read and write transducers toward or away from the disk surface in response to a signal. Any kind of actuator can be used, but a simple and effective actuator that is often used is one or more heaters (e.g., resistive heat element) located in the proximity of the read and write transducers. The heater causes localized protrusions near the transducers to the thermal expansion of the surrounding materials. A clearance sensor may be employed (e.g., a thermal sensor) to estimate the current fly height, which can be used as an input to a closed loop controller. In other embodiments, open loop control may be used, optionally with occasional measurements to check and adjust the open loop parameters.

Because the effects of the clearance actuator may be focused on the read transducer 300 and write transducer 108, the clearance actuator may not produce the same clearance changes at a physically separated erase transducer 114. Because the erase transducer 114 may not have operating specifications that are as stringent as the read/write transducers, it may be acceptable to disable write/erase clearance control. Reader clearance control may still be used so that the servo marks can still be accurately read by the read transducer 300 during erase operations.

In other embodiment, a heater (or other type of clearance actuator) could extend in a crosstrack direction between the read/write transducers 300, 108 and the erase transducer 114, or a separate heater could be located near the erase transducers 114. In the latter case, the separate heater could be electrically coupled (e.g., in series or in parallel) to the read/write clearance heater where it is actuated at the same time. Or a separate heater could be separately controlled. Similar arrangements could be made for clearance sensors—no clearance sensors near the erase transducer, a common read/write/erase clearance sensor, or a separate clearance sensor near the erase transducer.

As noted above, some drives employ HAMR which heats a spot on the media while it is being recorded. This heat locally reduces the magnetic coercivity of the media surface, allowing the writer to change the magnetic field within the hotspot, while the region outside the hotspot is unaffected. The erase transducer 114 in such a case could still operate, but would be designed to output a higher field strength to overcome the high magnetic coercivity of the recording medium. In other embodiments, the media could be heated, but using a much larger hotspot than is used for the data recording. Such a heating system may employ far-field optics (e.g., focusing lens) for the erase transducer, which may be easier to manufacture into the head than the near-field optics (e.g., near-field transducer) used for HAMR data recording.

Figure 9:
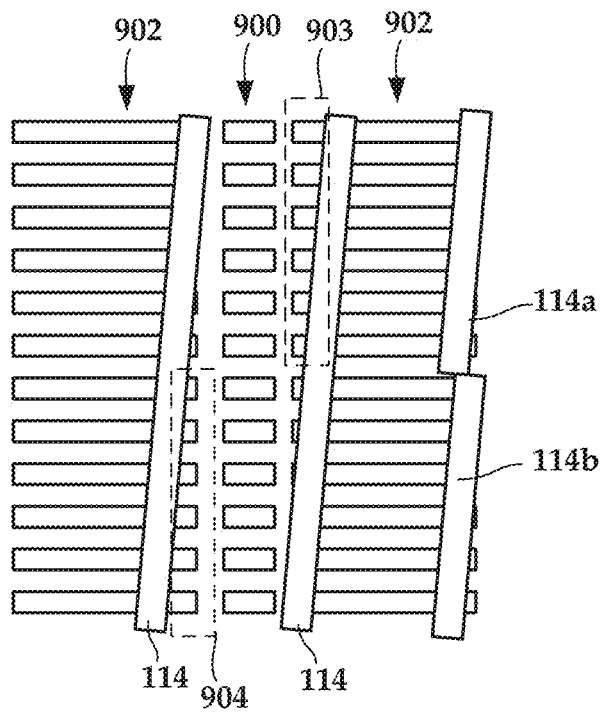
FIG. 9 is a diagram showing effects of skew on erasure near servo marks.

In order for the data storage drive to be usable after the erasure using a recording head as described above, the controller may need to ensure that the servo marks on the disk are not erased along with the user data. In FIG. 9, a diagrams shows an example of servo marks 900 for a group of tracks. User data sectors 902 are shown on either side of the servo marks 900. The servo marks 900 are typically aligned along radial lines of the disk such that turning off the erase transducer 114 when traversing the servo marks may be sufficient to prevent erasure of the marks along all of the erased tracks.

In high skew regions, the relatively wide erase transducer 114 may be misaligned with the servo marks at its inner and outer edges. This is shown in FIG. 9, where the erase transducer 114 is shown on the left and right before and after traversing the servo mark. If so, the erase transducer may be deactivated earlier and reactivated later the write transducer would be if it traversed the same region. This may lead to a few user data bits near the servo not being erased (shown in regions 903 and 904), which may be acceptable. In other cases, a split transducer scheme, e.g., segments 114a-b shown in the right side of FIG. 9, may be used in high skew areas to allow erasure closer to the servo marks by using offset segments for erasure. In FIG. 9, the segments are offset physically, although a similar effect can be achieved by a phase offset applied to the activation signals that activate the segments 114a-b.

The disk typically has a number of radial zones with different numbers of servo marks. This allows using a large number of servo marks corresponding to the larger diameters at the outer zones and a fewer number of servo marks at the inner zones with smaller diameters. The erasure servo control should take this into account such that the erase transducer should not span the boundary between two zones which could result in the loss of servo data.

In addition to avoiding damage to the servo marks, the data storage device may be operable to verify that erasure of user data sectors was successful. This may be done by, after erasure, reading one track of the multiple tracks that were erased, e.g., the last track in the series. If the erasure signal was a pure tone, then erasure is verified if the tone is read back. If the erasure signal was random data, some other method of verification may be used, e.g., storing the track signal in memory and comparing the readback signal to the stored signal, confirming that the readback signal will not decode, etc. In embodiments where the erase transducer 114 is crosstrack separated from the read transducer 300 (e.g., FIGS. 3-5), the read transducer 300 may be operable to read data sectors on one track of a previous set of erased tracks at the same time that the erase transducer 114 is erasing a next set of tracks. In such a case, the erasure-plus-verification need not take any longer than erasure without verification.

Figure 7:
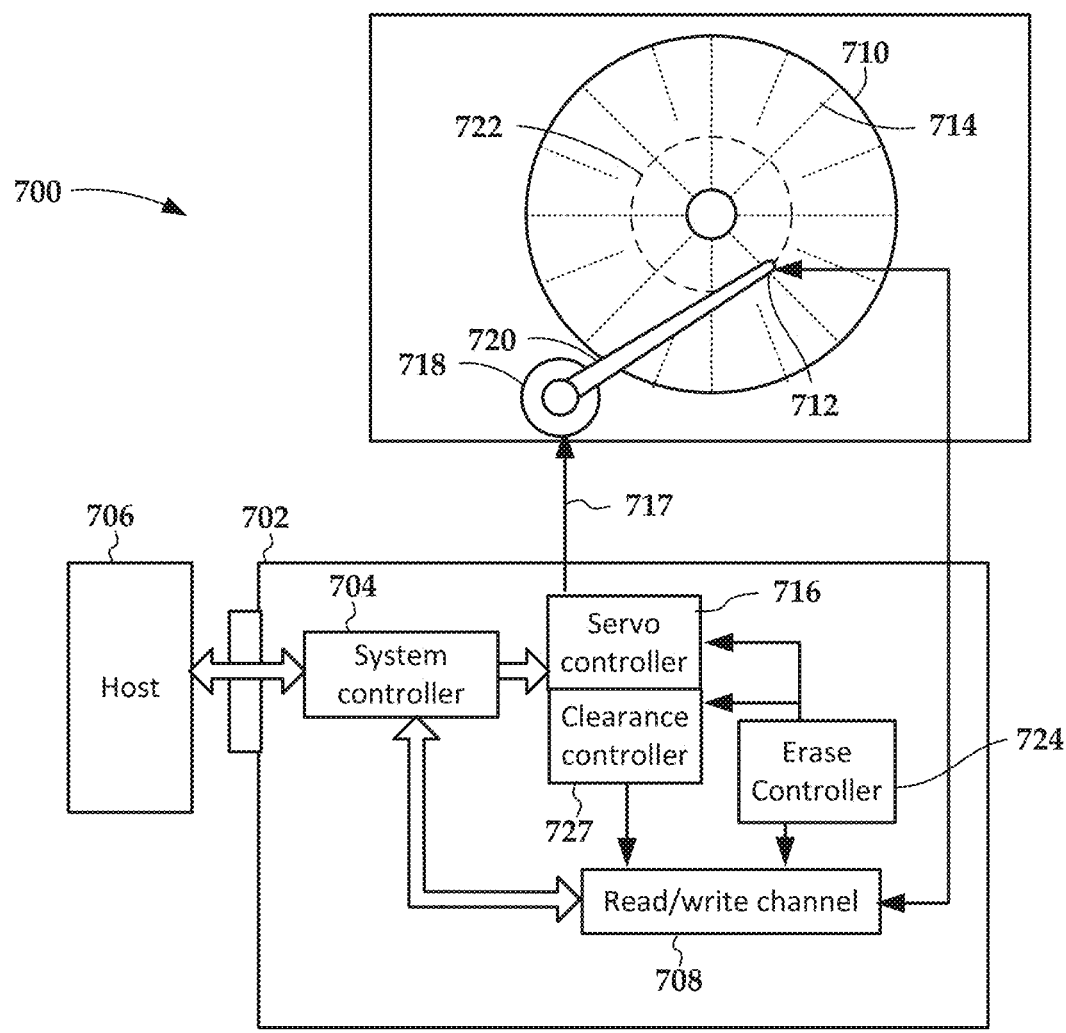
FIG. 7 is a block diagram of a data storage device according to an example embodiment.

In FIG. 7, a block diagram illustrates a data storage apparatus 700 according to an example embodiment. Control logic circuit 702 of the apparatus 700 includes a system controller 704 that processes read and write commands and associated data from a host device 706. The host device 706 may include any electronic device that can be communicatively coupled to store and retrieve data from a data storage device, e.g., a computer, peripheral card, etc. The system controller 704 is coupled to a read/write channel 708 that reads from and writes to a surface of a magnetic disk 710.

The read/write channel 708 generally converts data between the digital signals processed by the system controller 704 and the analog signals conducted through one or more read/write heads 712. For example, the read/write channel 708 converts analog signals detected from the disk to encoded user data, and converts digital data (e.g., user data received from the host device 706) to analog signals that write encoded user data to the disk. To facilitate these operations, the read/write channel 708 may include analog and digital interface circuitry such as preamplifiers, filters, decoders, digital-to-analog converters, analog-to-digital converters, timing-correction units, etc.

In addition to reading user data, the read/write channel 708 provides servo data read from servo wedges 714 on the magnetic disk 710 to a servo controller 716. The servo controller 716 uses these signals to provide a control signal 717 to a voice coil motor (VCM) 718. The VCM 718 moves (e.g., rotates) an arm 720 upon which the read/write heads 712 are mounted in response to the servo control signal 717. The servo control signal 717 may also be used to provide fine motion control, e.g., during track following, by moving microactuators (not shown) located near the read/write head 712.

Data within the servo wedges 714 is used to detect the location of a read/write head 712 relative to the magnetic disk 710. The servo controller 716 uses servo data to move the read/write head 712 to an addressed track 722 and sector on the magnetic disk 710 in response to the read/write commands (seek mode). While data is being written to and/or read from the disk 710, the servo data is also used to maintain the read/write head 712 aligned with the track 722 (track following mode).

A clearance controller 727 includes the functionality to drive a clearance control actuator that is embedded in the read/write head 712. This can be achieved by sending signals through the read/write channel 708 which cause power to be selectively applied to a clearance actuator (e.g., heater). The read/write channel 708 may also be used to transmit clearance measurements from a head-integrated sensor to the clearance controller 727. The clearance measurements may be used for closed loop control of the clearance, for example.

The read/write head 712 includes one or more dedicated magnetic erase transducers that are both physically and electronically separate from (or independently operable from) the write transducer. An erase controller 724 manages the erasure in response to commands from the system controller 704. For example, the apparatus 700 may be placed in an erase mode by the system controller 704. In this mode, the erase controller 724 is given a target region for erasure, e.g., in terms of tracks, cylinders, zones, disk surfaces, etc. In response, the servo controller 716 causes the read/write head to traverse the region while the erase controller 724 sends an erase signal through the read/write channel 708 (which may also be considered an erase channel). The erase signal may include one or more pure tones and/or random signals. The erase controller 724 may interact with the servo controller 716 and clearance controller 727 as described above, e.g., to account for the physical separation between the erase transducer and the read/write transducer, the larger crosstrack size of the erase transducer, etc.

Figure 8:
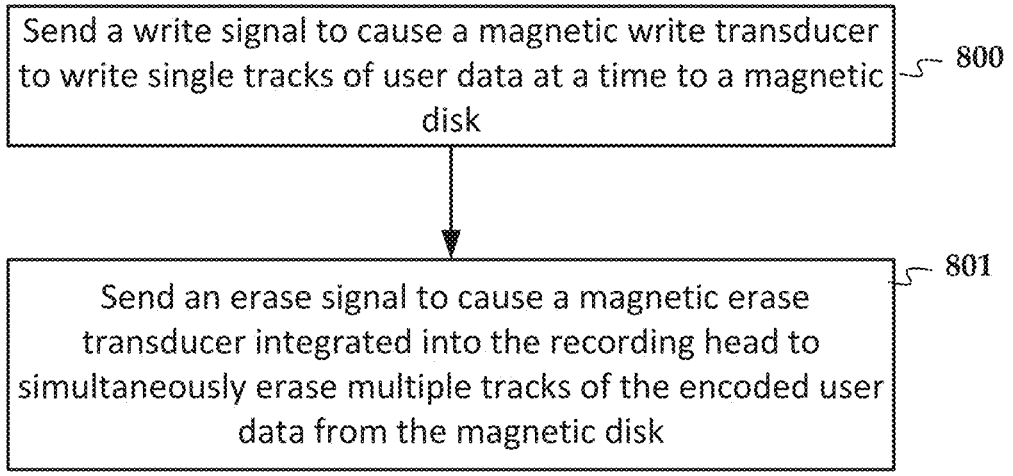
FIG. 8 is a flowchart of a method according to an example embodiment.

In FIG. 8, a flowchart shows a method according to an example embodiment. The method involves sending 800 a write signal to cause a magnetic write transducer to write single tracks of user data at a time to a magnetic disk. The magnetic write transducer has a first crosstrack width and is integrated into a recording head. An erase signal is sent 801 to cause a magnetic erase transducer integrated into the recording head to erase multiple tracks of the encoded user data at a time from the magnetic disk. The magnetic erase transducer is physically and electrically separate from the magnetic write transducer in the recording head. The magnetic erase transducer has a second crosstrack width at least two times larger than the first crosstrack width.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A recording head, comprising:
   a magnetic write transducer having a first crosstrack width operable to write a single track of data at a time to a magnetic disk; and
   a magnetic erase transducer separate from the magnetic write transducer, wherein the magnetic erase transducer is aligned with and offset from the magnetic write transducer in a crosstrack direction, the magnetic erase transducer comprising two or more crosstrack segments that can be individually activated, the two or more crosstrack segments having different crosstrack widths, at least one of the different crosstrack widths corresponding to a second crosstrack width operable to simultaneously erase multiple tracks of data from the magnetic disk.

2. The recording head of claim 1, wherein the second crosstrack width is greater than ten times the first crosstrack width.

3. The recording head of claim 1, wherein the magnetic write transducer is driven by a write channel signal with encoded user data, and the magnetic erase transducer is separately driven by an erase channel signal, wherein the erase channel signal comprises at least one of a random signal and one or more pure tones.

4. The recording head of claim 1, wherein a first crosstrack segment of the two or more crosstrack segments is sized to erase one shingled magnetic recording (SMR) band comprising a first number of multiple tracks.

5. The recording head of claim 4, wherein a second crosstrack segment of the two or more crosstrack segments is sized to erase multiple SMR bands, each band of the multiple SMR bands comprising the first number of multiple tracks.

6. The recording head of claim 4, wherein a second crosstrack segment of the two or more crosstrack segments is sized to erase a single, second SMR band, the second SMR band comprising a second number of multiple tracks different than the first number.

7. The recording head of claim 1, wherein the two or more crosstrack segments are separated from one another on the recording head in a downtrack direction.

8. A data storage device, comprising:
   a magnetic disk;
   a recording head comprising:
      a magnetic write transducer having a first crosstrack width; and
      a magnetic erase transducer physically and electrically separate from the magnetic write transducer, the magnetic erase transducer comprising two or more crosstrack segments that can be individually activated, the two or more crosstrack segments having different crosstrack widths, at least one of the different crosstrack widths corresponding to a second crosstrack width at least two times larger than the first crosstrack width; and
   a controller coupled to the recording head and operable to:
      send a write signal to cause the magnetic write transducer to write single tracks of encoded user data at a time to the magnetic disk; and
      send an erase signal to cause the magnetic erase transducer to simultaneously erase multiple tracks of the encoded user data from the magnetic disk.

9. The data storage device of claim 8, wherein the second crosstrack width is greater than ten times the first crosstrack width.

10. The data storage device of claim 8, wherein the magnetic erase transducer is aligned with and offset from the magnetic write transducer in a crosstrack direction.

11. The data storage device of claim 8, wherein the magnetic write transducer is driven by a write channel signal with encoded user data, and the magnetic erase transducer is separately driven by an erase channel signal, wherein the erase channel signal comprises at least one of a random signal and one or more pure tones.

12. The data storage device of claim 8, wherein a first crosstrack segment of the two or more crosstrack segments is sized to erase one shingled magnetic recording (SMR) band comprising a first number of multiple tracks.

13. The data storage device of claim 8, wherein the two or more crosstrack segments are separated from one another on the recording head in a downtrack direction.

14. A method comprising:
   sending a write signal to cause a magnetic write transducer to write single tracks of encoded user data at a time to a magnetic disk, the magnetic write transducer having a first crosstrack width and integrated into a recording head;
   activating a first crosstrack segment of a magnetic erase transducer integrated into the recording head to simultaneously erase multiple tracks of the encoded user data from the magnetic disk, the magnetic erase transducer physically and electrically separate from the magnetic write transducer in the recording head, the first crosstrack segment having a second crosstrack width at least two times larger than the first crosstrack width; and activating a second crosstrack segment of the magnetic erase transducer different from the first crosstrack segment to erase at least one other track of the encoded user data from the magnetic disk at a width that is different than the second crosstrack width.

15. The method of claim 14, wherein the second crosstrack width is greater than ten times the first crosstrack width.

16. The method of claim 14, wherein the magnetic erase transducer is aligned with and offset from the magnetic write transducer in a crosstrack direction.

17. The method of claim 14, wherein the magnetic write transducer is driven by a write channel signal with the encoded user data, and the magnetic erase transducer is separately driven by an erase channel signal, wherein the erase channel signal comprises at least one of a random signal and one or more pure tones.

18. The method of claim 14, further comprising reading one of the multiple tracks via a read transducer of the recording head to verify the erasure.

19. The method of claim 14, wherein a target band of tracks to be erased spans a crosstrack distance more than the second crosstrack width, and wherein the magnetic erase transducer simultaneously erases a first set of multiple tracks and then simultaneously erases a second set of multiple tracks that overlaps the first set of multiple tracks.

* * * * *